Aug. 14, 1951     F. A. NAGEL     2,564,308
SURFACE TREATMENT OF MOLDS
Filed Feb. 14, 1950
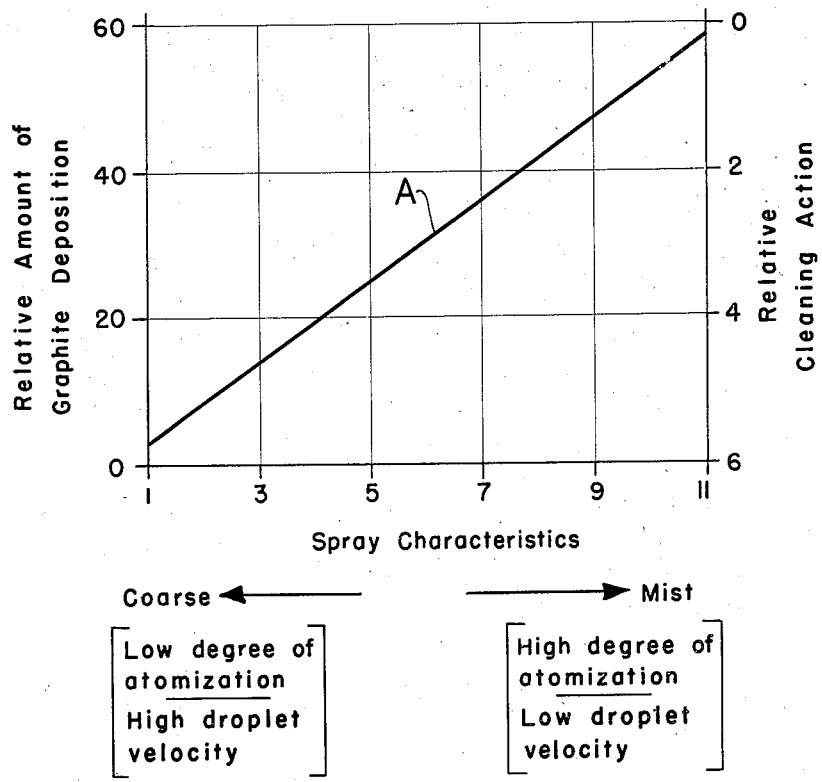
INVENTOR.
Francis A. Nagel
BY
HIS ATTORNEYS Patented Aug. 14, 1951

2,564,308

UNITED STATES PATENT OFFICE 2,564,308

SURFACE TREATMENT OF MOLDS

Francis A. Nagel, Paducah, Ky.

Application February 14, 1950, Serial No. 144,073

10 Claims. (Cl. 18—47)

This invention relates to the surface treatment of molds and more particularly to a composition and method for treating glass molds and similar articles for the purpose of preventing oxidation of the mold surfaces and providing a good parting medium which prevents the gobs of glass from sticking to the molds, allows the finished articles to be removed readily from the molds, and which keeps the surfaces of the molds clean.

The drawing is a diagram showing the relative amount of graphite deposition on a mold surface and the relative cleaning action obtained when a mold having a high temperature is sprayed with an aqueous solution of colloidal graphite and a surface active agent in accordance with my invention.

It is common practice at present to spray glass molds with oil or with a dispersion of colloidal graphite in oil for the purpose of preventing oxidation of the mold surface and for providing a parting medium. The use of oil for this purpose, either alone or as a medium for dispersing colloidal graphite, is objectionable for various reasons. The oil when vaporized by the hot molds deposits hard carbon which has to be removed, and furthermore it creates considerable volumes of smoke which are injurious to the workmen. Furthermore, the smoke recondenses on the entire plant—machinery, beams, rafters, walls, roof and the like—thereby creating a serious fire hazard which becomes progressively worse as the accumulation increases.

In making glassware in automatic glass forming machinery the glass molds usually operate at temperature of about 500° F. or 600° F. up to 1100° F. My invention provides a method whereby glass molds operating at these high temperatures can be treated with an aqueous dispersion of colloidal graphite so as to provide an adherent parting and protective film or layer of colloidal graphite on the molds. Thus my method can be used while the molds are in use in automatic glass forming machinery and while at the temperature required for molds when in use in such machinery.

Prior attempts have been made to provide glass molds with a film of graphite by spraying the molds at a relatively low temperature with an aqueous dispersion of colloidal graphite. Garratt Patent No. 2,246,463 discloses such a method which involves heating the molds to a temperature above the boiling point of water but not higher than 450° F., then applying to the surface an aqueous solution of colloidal graphite, and thereafter heating the molds to a temperature of at least 500° F. The molds are then put in use in a glass forming machine and during such use are sprayed with an oil dispersion of colloidal graphite. The pretreatment with the aqueous dispersion of colloidal graphite has to be carried out at a temperature below 450° F. in order that the graphite will adhere to the mold surface. It is evident, therefore, that the Garratt method of spraying the molds with an aqueous dispersion of colloidal graphite is not applicable to the treatment of glass molds when in use in automatic glass forming machinery since such use involves temperatures between 500° F. and 1100° F. Garratt must employ an oil dispersion of colloidal graphite for spraying the molds when in actual use at high temperatures in an automatic glass forming machine. This involves the disadvantages previously referred to, i. e., the formation of hard carbon deposits on the mold surfaces, and the creation of large volumes of smoke, which is injurious to the workmen and is a serious fire hazard.

In accordance with my invention, I have provided an aqueous dispersion of colloidal graphite and a method which enables that dispersion to be applied to glass molds while still at high temperatures such as exist in automatic glass forming machinery (temperatures from 500 to 1100° F.) and still produce an adherent film or coating on the surface of the molds which prevents oxidation of the mold surfaces and provides a good parting medium. The use of an aqueous dispersion in place of an oil dispersion overcomes the disadvantages above mentioned to which an oil dispersion is subject.

In accordance with my invention, I spray the mold surface while at a temperature of at least 500° F. with an aqueous dispersion of colloidal graphite and a surface active agent which lowers the surface tension of water. Any surface active agent which lowers the surface tension of water and which does not flocculate the colloidal graphite between the time that it is added to the dispersion and the time when the dispersion is employed, can be used. The following are representative but non-limiting examples of surface active agents which have been successfully used.

1. "Aerosol OT"—Dioctyl sodium sulfosuccinate (100% active agent)
2. Kreelon 4D—Alkyl aryl sulfonate (40% active agent)
3. Triton X-200—Sodium salt of alkalated aryl polyether sulfonate (28% active agent)
4. Tergitol 7—Sodium sulfate derivative of 3,9-diethyl tridecanol-6 (25% active agent)
5. Antarox B-100—Polyethylene glycol oleate
6. Diethylene glycol
7. Monobutyl ether of diethylene glycol The two last mentioned surface active agents in general are not as satisfactory as the other agents for my purposes.

My aqueous dispersion requires only a very small concentration of collodial graphite. I can use as little as 0.02% by weight of colloidal graphite in my dispersion or as high as 10% or even higher, the preferred amount of colloidal graphite being between 0.04% and 1.0% by weight of the dispersion. An amount of 0.04% colloidal graphite is less than that generally employed in the commercially accepted oil-graphite dispersions.

In accordance with my invention, the surface active agent is employed in an amount between 0.005% and 10% by weight of the dispersion, the preferred range being 0.05% to 1.0%.

I may, if desired, add to the aqueous dispersion of colloidal graphite and surface active agent a corrosion inhibitor such for example as ethylenediamine or morpholine. These materials may be used in amounts between 0.01% and 10%, preferably between 0.01% and 3% by weight.

In order to prevent flocculation of the colloidal graphite in my aqueous dispersion, the dispersion must be alkaline. In carrying out my invention the dispersion can have a pH of 7.5 to 13.0, but to obtain the best results the pH should be at least 9.5, a preferred range being between 9.5 and 11. Among the suitable alkaline materials which may be used for providing the proper pH in my dispersion, I mention ammonium hydroxide, morpholine and monoethanolamine.

For reasons which are not entirely understood, the addition of a surface active agent to the aqueous disersion of colloidal graphite allows spray deposition of graphite at mold temperatures as high as 1100° F. In view of the fact that, ordinarily, the almost explosive change of the water into steam at such temperature tends to physically remove any graphite from the mold surface, it is distinctly unexpected that the addition of a surface active agent, especially when used in such small quantities, allows such an excellent graphite deposition. Previous to my invention it has been the opinion of those skilled in the art that satisfactory deposition of graphite could not be obtained by spraying a hot mold surface with an aqueous dispersion of colloidal graphite. It was believed that the aqueous dispersion must be applied to a relatively cool mold surface, i. e., a mold surface having a temperature lower than 450° F. because otherwise the difference in temperature between the mold surface and the water dispersion would convert the water into steam with almost explosive violence, carrying with it mechanically any solids contained in the dispersion.

The following are typical examples of aqueous dispersions of colloidal graphite and surface active agent which may be employed according to my invention. In these examples and throughout the description, unless otherwise specifically stated, the percentages of materials employed are by weight:

*Example 1*

| | Parts |
|---|---|
| Colloidal graphite dispersion (22% in water) | 10 |
| Ammonium hydroxide (25% in water) | 20 |
| "Tergitol 7" | 2 |
| Water, distilled | 1000 |

These ingredients are stirred together in the order given. Upon complete dispersion of the entire mass, the suspension is ready for use.

*Example 2*

| | Parts |
|---|---|
| Colloidal graphite dispersion (22% in water) | 2 |
| Ammonium hydroxide (25% in water) | 125 |
| "Kreelon 4D" | 30 |
| Water, distilled | 1000 |

The first ingredient is thoroughly dispersed in the distilled water, the ammonium hydroxide added, followed by the Kreelon 4D. After complete mixing, the suspension is ready for use.

*Example 3*

| | Parts |
|---|---|
| Colloidal graphite (22% in water) | 250 |
| "Kreelon 4D" | 23 |
| Monoethanolamine | 40 |
| Water, tap | 1000 |

The last two ingredients are mixed together, the colloidal graphite added and thoroughly dispersed, followed by the Kreelon 4D. Upon complete mixing of the entire suspension, the material is ready for use.

*Example 4*

| | Parts |
|---|---|
| Colloidal graphite (22% in water) | 5 |
| Monoethanolamine | 2 |
| Ammonium hydroxide (25% in water) | 45 |
| "Tergitol 7" | 1 |
| Water, distilled | 1000 |

Prepare as in Example 1.

*Example 5*

| | Parts |
|---|---|
| Colloidal graphite (22% in water) | 17 |
| Morpholine | 20 |
| Ammonium hydroxide (25% in water) | 28 |
| Antarox B-100 | 6 |
| Water, distilled | 1000 |

Prepare as in Example 1.

*Example 6*

| | Parts |
|---|---|
| Colloidal graphite (22% in water) | 75 |
| Morpholine | 8 |
| "Triton X-200" | 19 |
| Water, distilled | 1000 |

Prepare as in Example 2.

*Example 7*

| | Parts |
|---|---|
| Colloidal graphite (22% in water) | 30 |
| Ammonium hydroxide (25% in water) | 100 |
| Diethylene glycol monobutyl ether | 65 |
| Water, tap | 1000 |

Prepare as in Example 3.

*Example 8*

| | Parts |
|---|---|
| Colloidal graphite (22% in water) | 12 |
| Ammonium hydroxide (25% in water) | 40 |
| Morpholine | 1 |
| Monoethanolamine | 8 |
| "Aerosol OT" | 3 |
| Water, distilled | 1000 |

Prepare as in Example 1.

It is observed that either tap water or distilled water may be employed. However, I prefer to employ distilled water in order to insure the absence of any undesired impurities which could cause flocculation of the colloidal graphite and/or undesirable deposits on the surface of the hot glass mold.

In carrying out my method I spray the mold surface while at a temperature of at least 500° F. with an aqueous dispersion of colloidal graphite and a surface active agent which lowers the surface tension of water.

Factors which should be taken into consideration in obtaining the best results are the quantity of dispersion applied to the mold surface, the line pressure employed in carrying out the spraying of the dispersion, and the size of the droplets formed by the spray. For obtaining maximum graphite deposition, the control of these factors is just the reverse of what one might logically expect and are just the reverse of the conditions which should be employed for maximum graphite deposition where an aqueous dispersion of colloidal graphite is sprayed against a mold surface having a temperature below 450° F., as disclosed in the Garratt patent previously referred to. Specifically, for maximum graphite deposition by spraying an aqueous dispersion of colloidal graphite against a mold surface having a temperature below 450° F., one should employ a large quantity of dispersion applied at a high line pressure and the size of the sprayed droplets should be large. According to my invention, however, where an aqueous dispersion of colloidal graphite and a surface active agent is sprayed against a mold surface having a temperature of at least 500° F., the quantity of dispersion applied to the mold surface should be small, the line pressure of the dispersion should be low, and the size of the sprayed droplets should be small.

Referring to the accompanying drawing, the left-hand vertical ordinate represents the relative amount of graphite deposition obtained by different spray characteristics, the spray characteristics being represented by arbitrary units on a horizontal ordinate. With any given spray nozzle, the higher the line air pressure the smaller will be the size of the droplets (high degree of atomization) discharged from the nozzle, and vice versa. Also with a given nozzle, the higher the line air pressure, the greater will be the velocity of the discharged droplets, and vice versa. In my method, the greatest graphite deposition is obtained using a spray nozzle that discharges very small droplets traveling at low velocity. This is shown in the accompanying diagram by the line A, from which it is evident that the amount of graphite deposited increases where the spray is in the form of a mist or fog, as contrasted with a spray having coarse particles. Also, the amount of graphite deposited increases as the velocity of the droplets decreases.

In carrying out my invention in order to obtain maximum graphite deposition, I apply to the hot mold surface only a relatively small quantity of the aqueous dispersion per spray interval, a spray interval being the period between two glass molding operations. The quantity of dispersion applied is such as not to lower the temperature of the mold appreciably. The amount of dispersion used per spray interval is between 0.0025 gram and 0.030 gram per square inch of mold surface, the optimum amount being between 0.007 and 0.010 gram per square inch of mold surface. To give an idea of what actual quantities of dispersion these limits involve, the manufacture of a 12 ounce capacity beer bottle would require per mold approximately 0.1 gram to 1.0 gram, the optimum amount being approximately 0.25 gram to 0.32 gram. According to my method, the size of the spray droplets is small, the spray preferably being in the form of a fog or mist in which the maximum diameter of the spray droplets is 100 microns. The line pressure is low so as to produce a low velocity of the sprayed droplets, preferably the velocity of the droplets at the mold surface is less than that which would sting the hand. By employing an aqueous dispersion of colloidal graphite and a surface active agent and by controlling the factors in the manner described, I can obtain a maximum graphite deposition.

Referring again to the diagram, the relative cleaning action of the spray is dependent upon the characteristics of the spray and is inversely proportional to the rate of graphite deposition. Thus to obtain relatively great cleaning action on the mold surface and relatively small deposition of graphite, one employs a spray having characteristics represented by the left-hand end of the line A. These spray characteristics are coarse or large size droplets flowing at a high velocity. In addition, high cleaning action and low graphite deposition is obtained by applying relative large amounts of the dispersion to the hot mold surface.

From the chart it is apparent that under a certain set of spray characteristics the mold surfaces can be coated with a deposit of graphite and under a different set of spray characteristics the mold surfaces can be cleaned to remove foreign deposits which may result after a time from the glass forming operation. In a preferred manner of employing my method, I periodically spray on to a mold surface having a temperature of at least 500° F. an aqueous dispersion of colloidal graphite and a surface active agent which lowers the surface tension of water. This periodic spraying is carried out while the mold is in use in a glass forming operation and while the mold is at a temperature commonly employed in such operation. During this periodic spraying the amount of dispersion applied is so small that it does not lower the temperature of the mold appreciably. The spray is in the form of a mist or fog having small sized droplets and the velocity of the droplets is low. These conditions form an adherent graphite deposit on the mold surface. From time to time during the glass forming operation I clean the mold surface while at a temperature above 500° F. by subjecting it to a cleaning spray of the aqueous dispersion of colloidal graphite and surface active agent by applying a quantity of the dispersion which is large enough and at a velocity which is high enough and with a droplet size which is large enough so as to exert a cleaning action on the mold surface. Generally speaking, the cleaning spray operation employs a quantity of dispersion which is larger than that employed for depositing graphite, and the velocity is higher and the size of the droplets is greater than that employed for depositing graphite. By employing this combination of spraying treatments employed at high mold temperatures, I am enabled to maintain the molds in use for long periods of time while still avoiding the employment of objectionable oil dispersions.

Graphite can be deposited on a mold surface having a temperature of at least 500° F. by employing my spraying method in which the amount of dispersion applied and the size and velocity of the sprayed droplets are controlled as previously described, but omitting the surface active agent from the aqueous dispersion of colloidal graphite. Where the surface active agent is omitted, the pH of the dispersion should be from 9 to 13.0, the preferred range being 10.0 to 11.0. However, the results obtained where the surface active agent is omitted are definitely inferior to those resulting from the use of the surface active agent but are adequate to serve certain purposes.

I claim:
1. The method of treating molds and the like, which comprises spraying on to a mold surface having a temperature of at least 500° F. an aqueous dispersion of colloidal graphite and a surface active agent which lowers the surface tension of water, and regulating the dispersion applied per spray interval to an amount between 0.0025 gram and 0.030 gram per square inch of mold surface.

2. The method according to claim 1, wherein the spray is in the form of a mist whose droplets have a maximum diameter of 100 microns.

3. The method according to claim 1, wherein the spray is in the form of a mist whose droplets have a maximum diameter of 100 microns and wherein the velocity of the mist droplets at the mold surface is less than that which would sting the hand.

4. The method of treating molds and the like, which comprises spraying on to a mold surface having a temperature of at least 50° F. an aqueous dispersion containing by weight 0.02% to 10% colloidal graphite and 0.005% to 10% of a surface active agent which lowers the surface tension of water, and regulating the dispersion applied per spray interval to an amount between 0.0025 gram and 0.030 gram per square inch of mold surface.

5. The method of treating molds and the like, which comprises spraying on to a mold surface having a temperature of at least 500° F. an aqueous dispersion containing 0.04% to 1.0% colloidal graphite and 0.05% to 1.0% by weight of a surface active agent which lowers the surface tension of water, and regulating the dispersion applied per spray interval to an amount between 0.0025 gram and 0.030 gram per square inch of mold surface.

6. The method of treating molds and the like, which comprises spraying on to a mold surface having a temperature of at least 500° F. an aqueous dispersion of colloidal graphite, a surface active agent which lowers the surface tension of water, and an alkaline material in amount to give the dispersion a pH between 7.5 and 13.0, and regulating the dispersion applied per spray interval to an amount between 0.0025 gram and 0.030 gram per square inch of mold surface.

7. The method of treating molds and the like, which comprises spraying on to a mold surface having a temperature of at least 500° F. an aqueous dispersion of colloidal graphite, a surface active agent which lowers the surface tension of water, and an alkaline material in amount to give the dispersion a pH between 9.5 and 11.0, and regulating the dispersion applied per spray interval to an amount between 0.0025 gram and 0.030 gram per square inch of mold surface.

8. The method of treating molds and the like, which comprises spraying on to a mold surface having a temperature of at least 500° F. an aqueous dispersion containing by weight 0.02% to 10% colloidal graphite and 0.005% to 10% of a surface active agent which lowers the surface tension of water, and regulating the dispersion applied per spray interval to an amount between 0.0025 gram and 0.030 gram per square inch of mold surface, the spraying being in the form of a mist whose droplets have a maximum diameter of 100 microns, the velocity of the mist droplets at the mold surface being less than that which would sting the hand.

9. The method of treating molds and the like, which comprises periodically spraying on to a mold surface having a temperature of at least 500° F. an aqueous dispersion of colloidal graphite and a surface active agent which lowers the surface tension of water, regulating the dispersion applied per spray interval to an amount between 0.0025 gram and 0.030 gram per square inch of mold surface, thereby depositing graphite on the mold surface, and from time to time cleaning the mold surface while at a temperature above 500° F. by subjecting it to a cleaning spray of an aqueous dispersion of colloidal graphite and a surface active agent which lowers the surface tension of water, said cleaning spray being applied in a quantity large enough and at a velocity high enough and with a droplet size large enough to exert a cleaning action on the mold surface.

10. The method of treating molds and the like, which comprises periodically spraying on to a mold surface having a temperature of at least 500° F. an aqueous dispersion of colloidal graphite and a surface active agent which lowers the surface tension of water, regulating the dispersion applied per spray interval to an amount between 0.0025 gram and 0.050 gram per square inch of mold surface, thereby depositing graphite on the mold surface, and from time to time cleaning the mold surface while at a temperature above 500° F. by subjecting it to a cleaning spray of an aqueous dispersion of colloidal graphite and a surface active agent which lowers the surface tension of water, said cleaning spray being applied in a quantity which is relatively large and at a velocity which is relatively high and with a droplet size which is relatively large as compared with that employed in the periodic spraying employed for depositing graphite.

FRANCIS A. NAGEL.

REFERENCES CITED

The following references are of record in the file of this patent:

UNITED STATES PATENTS

| Number | Name | Date |
|---|---|---|
| 549,223 | Allen | Nov. 5, 1895 |
| 905,649 | Chapman | Dec. 1, 1908 |
| 1,680,227 | Mambourg | Aug. 7, 1928 |
| 2,083,176 | Willson | June 8, 1937 |
| 2,201,271 | Partridge | May 21, 1940 |
| 2,236,119 | Craig et al. | Mar. 25, 1941 |
| 2,246,463 | Garratt | June 17, 1941 |
| 2,279,859 | Crawford | Apr. 14, 1942 |

OTHER REFERENCES

The Iron Age, "Colloidal Graphite As a Die-Casting Lubricant," by William Jennings, Feb. 25, 1937, pp. 41 and 82.

Glass Industry, vol. 26, No. 3, March 1945, "Colloidal Graphite and its Uses in the Glass Industry," by Raymond Szymanowitz, pp. 125–127, 151.

Certificate of Correction

Patent No. 2,564,308                                                  August 14, 1951

FRANCIS A. NAGEL

It is hereby certified that error appears in the printed specification of the above numbered patent requiring correction as follows:

Column 7, line 25, for "50° F." read *500° F.*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*